United States Patent
Provan et al.

(10) Patent No.: US 6,292,986 B1
(45) Date of Patent: Sep. 25, 2001

(54) ASSEMBLY AND ACCUMULATION OF SLIDERS FOR PROFILED ZIPPERS

(76) Inventors: Alexander R. Provan, 6 Arlington Park, Canandaigua, NY (US) 14424; Toby R. Thomas, 8 Kurt Rd., Pittsford, NY (US) 14534; Eric A. St. Phillips, 24 Timber La., Fairport, NY (US) 14450

( * ) Notice: Subject to any disclaimer, the term of this patent is extended or adjusted under 35 U.S.C. 154(b) by 0 days.

(21) Appl. No.: 09/307,893

(22) Filed: May 10, 1999

(51) Int. Cl.$^7$ ............................ A44B 19/26; B21D 39/03
(52) U.S. Cl. .................... 24/415; 24/383; 24/399; 24/403; 24/448; 29/428
(58) Field of Search ........................ 24/415, 403, 404, 24/383, 397, 306, 448, 449, 399, 400; 29/428

(56) References Cited

U.S. PATENT DOCUMENTS

| | | | |
|---|---|---|---|
| Re. 27,174 | 9/1971 | Ausnit | 150/3 |
| Re. 31,487 | 1/1984 | Freidberg | 24/386 |
| Re. 34,554 | 3/1994 | Ausnit | 383/63 |
| Re. 34,905 | 4/1995 | Ausnit | 53/412 |
| Re. 34,906 | 4/1995 | Tamaki et al. | 123/399 |
| 1,785,234 | * 12/1930 | Sundback | 24/415 |
| 2,091,617 | * 8/1937 | Sundaback | 24/403 |
| 3,149,927 | * 9/1964 | Fady | 24/383 |
| 3,225,429 | * 12/1965 | Fady | 24/383 |
| 3,259,951 | 7/1966 | Zimmerman | 24/201 |
| 3,381,592 | 5/1968 | Ravel | 93/8 |
| 3,426,396 | 2/1969 | Laguerre | 24/201 |
| 3,473,589 | 10/1969 | Götz | 150/3 |
| 3,532,571 | 10/1970 | Ausnit | 156/91 |
| 3,608,439 | 9/1971 | Ausnit | 93/35 R |
| 3,613,524 | 10/1971 | Behr et al. | 93/33 R |
| 3,701,191 | 10/1972 | Laguerre | 29/207.5 SL |
| 3,701,192 | 10/1972 | Laguerre | 29/207.5 SL |
| 3,785,111 | 1/1974 | Pike | 53/14 |
| 3,790,992 | 2/1974 | Herz | 24/201 C |
| 3,839,128 | 10/1974 | Arai | 156/583 |
| 3,849,843 | * 11/1974 | Alberts | 24/415 |
| 3,868,891 | 3/1975 | Parish | 93/8 W |
| 3,948,705 | 4/1976 | Ausnit | 156/73.4 |
| 3,962,007 | * 6/1976 | Heimberger | 24/403 |
| 4,094,729 | 6/1978 | Boccia | 156/515 |
| 4,101,355 | 7/1978 | Ausnit | 156/66 |
| 4,196,030 | 4/1980 | Ausnit | 156/91 |
| 4,232,429 | 11/1980 | Friedberg | 24/205.11 R |
| 4,240,241 | 12/1980 | Sanborn, Jr. | 53/412 |
| 4,277,241 | 7/1981 | Schulze | 493/196 |
| 4,341,575 | 7/1982 | Herz | 156/66 |
| 4,355,494 | 10/1982 | Tilman | 53/416 |
| 4,372,793 | 2/1983 | Herz | 156/66 |
| 4,415,386 | 11/1983 | Ferrell et al. | 156/64 |
| 4,430,070 | 2/1984 | Ausnit | 493/215 |
| 4,437,293 | 3/1984 | Sanborn, Jr. | 53/412 |
| 4,446,088 | 5/1984 | Daines | 264/155 |

(List continued on next page.)

FOREIGN PATENT DOCUMENTS

| | | | | |
|---|---|---|---|---|
| 0 978 450 A1 | 2/2000 | (EP) | | B65B/9/20 |
| 0522663 | * 6/1940 | (GB) | | 24/400 |
| 2085519 A | 4/1982 | (GB) | | A44B/19/62 |
| 2138494 | * 10/1984 | (GB) | | 24/415 |
| WO 99/24325 | 5/1999 | (WO) | | B65B/61/18 |

Primary Examiner—Victor N. Sakran
(74) Attorney, Agent, or Firm—Jenkens & Gilchrist

(57) ABSTRACT

An assembly of sliders for zippers for plastic bags and the like and the accumulation of the sliders for use in form, fill and seal machines is disclosed. The sliders are oriented and mechanically or adhesively joined into chains. Mechanical assembly of sliders may be accomplished by snapping sliders together or slideably mounting sliders on a strip. Sliders may be adhesively assembled together by taping, welding, gluing, or melting the sliders. Sliders and chains of sliders are accumulated in cartridges, carriers, coreless rolls, spools or trays which are then connected to form, fill and seal machines for attachment of the sliders to a zipper and attachment of the zipper with a slider to bags.

41 Claims, 10 Drawing Sheets

U.S. PATENT DOCUMENTS

| | | | |
|---|---|---|---|
| 4,517,788 | 5/1985 | Scheffers | 53/459 |
| 4,528,224 | 7/1985 | Ausnit | 428/36 |
| 4,563,319 | 1/1986 | Ausnit et al. | 264/146 |
| 4,581,006 | 4/1986 | Hugues et al. | 493/213 |
| 4,582,549 | 4/1986 | Ferrell | 156/66 |
| 4,601,694 | 7/1986 | Ausnit | 493/381 |
| 4,612,153 | 9/1986 | Mangla | 264/154 |
| 4,617,683 | 10/1986 | Christoff | 383/63 |
| 4,620,320 | 10/1986 | Sullivan | 383/79 |
| 4,651,504 | 3/1987 | Bentsen | 53/452 |
| 4,652,496 | 3/1987 | Yasufuku et al. | 428/425.9 |
| 4,655,862 | 4/1987 | Christoff et al. | 156/66 |
| 4,663,915 | 5/1987 | Van Erden et al. | 53/450 |
| 4,666,536 | 5/1987 | Van Erden et al. | 156/64 |
| 4,673,383 | 6/1987 | Bentsen | 493/381 |
| 4,691,372 | 9/1987 | Van Erden | 383/63 |
| 4,703,518 | 10/1987 | Ausnit | 383/63 |
| 4,709,398 | 11/1987 | Ausnit | 383/63 |
| 4,709,533 | 12/1987 | Ausnit | 53/451 |
| 4,710,057 | 12/1987 | Posey | 493/213 |
| 4,782,951 | 11/1988 | Griesbach et al. | 206/484 |
| 4,786,190 | 11/1988 | Van Erden et al. | 383/61 |
| 4,787,880 | 11/1988 | Ausnit | 493/213 |
| 4,790,126 | 12/1988 | Boeckmann | 53/451 |
| 4,792,240 | 12/1988 | Ausnit | 383/63 |
| 4,807,300 | 2/1989 | Ausnit et al. | 383/65 |
| 4,812,074 | 3/1989 | Ausnit et al. | 493/213 |
| 4,832,505 | 5/1989 | Ausnit et al. | 383/5 |
| 4,840,012 | 6/1989 | Boeckmann | 53/410 |
| 4,840,611 | 6/1989 | Van Erden et al. | 493/213 |
| 4,844,759 | 7/1989 | Boeckmann | 156/66 |
| 4,850,178 | 7/1989 | Ausnit | 53/570 |
| 4,863,285 | 9/1989 | Claxton | 383/37 |
| 4,876,842 | 10/1989 | Ausnit | 53/410 |
| 4,878,987 | 11/1989 | Ven Erden | 156/519 |
| 4,891,867 * | 1/1990 | Takeshima et al. | 24/403 |
| 4,892,414 | 1/1990 | Ausnit | 383/63 |
| 4,892,512 | 1/1990 | Branson | 493/194 |
| 4,894,975 | 1/1990 | Ausnit | 53/412 |
| 4,909,017 | 3/1990 | McMahon et al. | 53/410 |
| 4,924,655 | 5/1990 | Posey | 53/128 |
| 4,925,316 | 5/1990 | Van Erden et al. | 383/61 |
| 4,925,318 | 5/1990 | Sorensen | 383/63 |
| 4,929,225 | 5/1990 | Ausnit et al. | 493/213 |
| 4,941,307 | 7/1990 | Wojcik | 53/412 |
| 4,969,309 | 11/1990 | Schwarz et al. | 53/412 |
| 4,971,454 | 11/1990 | Branson et al. | 383/61 |
| 4,974,395 | 12/1990 | McMahon | 53/551 |
| 4,987,658 | 1/1991 | Horita | 24/403 |
| 4,993,212 | 2/1991 | Veoukas | 53/451 |
| 5,005,707 | 4/1991 | Hustad et al. | 206/632 |
| 5,010,627 | 4/1991 | Herrington et al. | 24/400 |
| 5,014,498 | 5/1991 | McMahon | 53/451 |
| 5,024,537 | 6/1991 | Tilman | 383/63 |
| 5,027,584 | 7/1991 | McMahon et al. | 53/451 |
| 5,036,643 | 8/1991 | Bodolay | 53/128.1 |
| 5,042,224 | 8/1991 | McMahon | 53/133.4 |
| 5,046,300 | 9/1991 | Custer et al. | 53/412 |
| 5,063,639 | 11/1991 | Boeckmann et al. | 24/30.5 R |
| 5,063,644 | 11/1991 | Herrington et al. | 24/400 |
| 5,067,208 | 11/1991 | Herrington, Jr. et al. | 24/400 |
| 5,067,822 | 11/1991 | Wirth et al. | 383/61 |
| 5,071,689 | 12/1991 | Tilman | 428/121 |
| 5,072,571 | 12/1991 | Boeckmann | 53/133.4 |
| 5,085,031 | 2/1992 | McDonald | 53/412 |
| 5,088,971 | 2/1992 | Herrington | 493/203 |
| 5,092,831 | 3/1992 | James et al. | 493/394 |
| 5,096,516 | 3/1992 | McDonald et al. | 156/66 |
| 5,105,603 | 4/1992 | Natterer | 53/412 |
| 5,107,658 | 4/1992 | Hustad et al. | 53/408 |
| 5,111,643 | 5/1992 | Hobock | 53/551 |
| 5,116,301 | 5/1992 | Robinson et al. | 493/215 |
| 5,127,208 | 7/1992 | Custer et al. | 53/412 |
| 5,131,121 | 7/1992 | Herrington, Jr. et al. | 24/436 |
| 5,147,272 | 9/1992 | Richison et al. | 493/195 |
| 5,161,286 | 11/1992 | Herrington, Jr. et al. | 24/387 |
| 5,167,608 | 12/1992 | Steffens, Jr. et al. | 493/214 |
| 5,179,816 | 1/1993 | Wojnicki | 53/133.4 |
| 5,188,461 | 2/1993 | Sorensen | 383/63 |
| 5,198,055 | 3/1993 | Wirth et al. | 156/66 |
| 5,211,482 | 5/1993 | Tilman | 383/202 |
| 5,247,781 | 9/1993 | Runge | 53/412 |
| 5,254,073 | 10/1993 | Richison et al. | 493/195 |
| 5,259,904 | 11/1993 | Ausnit | 156/244.15 |
| 5,273,511 | 12/1993 | Boeckman | 493/195 |
| 5,322,579 | 6/1994 | Van Erden | 156/66 |
| 5,334,127 | 8/1994 | Bruno et al. | 493/194 |
| 5,383,989 | 1/1995 | McMahon | 156/66 |
| 5,391,136 | 2/1995 | Makowka | 493/210 |
| 5,400,565 | 3/1995 | Terminella et al. | 53/133.4 |
| 5,400,568 | 3/1995 | Kanemitsu et al. | 53/412 |
| 5,403,094 | 4/1995 | Tomic | 383/63 |
| 5,405,478 | 4/1995 | Richardson et al. | 156/308.4 |
| 5,405,629 | 4/1995 | Marnocha et al. | 426/122 |
| 5,412,924 | 5/1995 | Ausnit | 53/412 |
| 5,415,904 | 5/1995 | Takubo et al. | 428/35.2 |
| 5,425,216 | 6/1995 | Ausnit | 53/410 |
| 5,425,825 | 6/1995 | Rasko et al. | 156/66 |
| 5,431,760 | 7/1995 | Donovan | 156/66 |
| 5,435,864 | 7/1995 | Machacek et al. | 156/66 |
| 5,442,837 | 8/1995 | Morgan | 24/400 |
| 5,448,807 | 9/1995 | Herrington, Jr. | 24/399 |
| 5,456,928 | 10/1995 | Hustad et al. | 426/87 |
| 5,461,845 | 10/1995 | Yeager | 53/451 |
| 5,470,156 | 11/1995 | May | 383/210 |
| 5,482,375 | 1/1996 | Richardson et al. | 383/64 |
| 5,486,051 | 1/1996 | May | 383/200 |
| 5,489,252 | 2/1996 | May | 383/210 |
| 5,492,411 | 2/1996 | May | 383/5 |
| 5,505,037 | 4/1996 | Terminella et al. | 53/133.4 |
| 5,509,735 | 4/1996 | May | 383/210 |
| 5,511,884 | 4/1996 | Bruno et al. | 383/63 |
| 5,513,915 | 5/1996 | May | 383/210 |
| 5,519,982 | 5/1996 | Herber et al. | 53/412 |
| 5,525,363 | 6/1996 | Herber et al. | 426/130 |
| 5,542,902 | 8/1996 | Richison et al. | 493/195 |
| 5,551,127 | 9/1996 | May | 24/30.5 R |
| 5,551,208 | 9/1996 | Van Erden | 53/139.2 |
| 5,552,202 | 9/1996 | May | 428/43 |
| 5,557,907 | 9/1996 | Malin et al. | 53/139.2 |
| 5,558,613 | 9/1996 | Tilman et al. | 493/214 |
| 5,561,966 | 10/1996 | English | 53/412 |
| 5,564,259 | 10/1996 | Stolmeier | 53/410 |
| 5,573,614 | 11/1996 | Tilman et al. | 156/66 |
| 5,582,853 | 12/1996 | Marnocha et al. | 426/122 |
| 5,592,802 | 1/1997 | Malin et al. | 53/133.4 |
| 5,613,934 | 3/1997 | May | 493/214 |
| 5,622,431 | 4/1997 | Simonsen | 383/63 |
| 5,628,566 | 5/1997 | Schreiter | 383/63 |
| 5,647,671 | 7/1997 | May | 383/210 |
| 5,664,296 | 9/1997 | May | 24/30.5 R |
| 5,711,751 | 1/1998 | Harmanoglu | 493/224 |
| 5,713,110 * | 2/1998 | Covi et al | 24/415 |
| 5,713,669 | 2/1998 | Thomas et al. | 383/204 |
| 5,725,312 | 3/1998 | May | 383/210 |
| 5,782,733 | 7/1998 | Yeager | 493/213 |
| 5,823,933 | 10/1998 | Yeager | 493/213 |
| 5,906,438 | 5/1999 | Laudenberg | 383/63 |
| 5,956,815 | 9/1999 | O'Connor et al. | 24/30.5 |
| 5,956,924 | 9/1999 | Thieman | 53/412 |
| 6,138,436 | 10/2000 | Malin et al. | |
| 6,138,439 | 10/2000 | McMahon et al. | |
| 6,178,722 | 1/2001 | McMahon | 53/412 |

* cited by examiner

ASSEMBLY AND ACCUMULATION OF SLIDERS FOR PROFILED ZIPPERS

FIELD OF THE INVENTION

The present invention relates generally to an assembly of sliders for recloseable zippers used on bags, an accumulation of sliders, a method of assembling sliders, and a method of accumulating sliders.

RELATED APPLICATIONS

This application is related to an application entitled "Zipper and Zipper Arrangements And Methods of Manufacturing The Same"(Docket No. PCOS015); and to an application entitled "Fastener With Slider Thereon For Use In Manufacturing Recloseable Bags"(Docket No. PCOS014). Both applications were filed concurrently with this application and are assigned to the same assignee as the assignee of this application. Both applications and their disclosures are incorporated herein in their entirety.

BACKGROUND OF THE INVENTION

Plastic bags are popular for storing food and other items. Zippered plastic bags that can be securely closed and reopened are particularly popular due to their ability to maintain freshness of the food stored in the bags and/or to minimize leakage into and out of the bag. These bags are used one at a time by consumers and large numbers of these bags are also used by businesses to package items that are then sold to consumers. An example of a business that uses a large number of these bags is a food producer and packer. For example, nuts, candy snacks, ingredients, salt, cheese and other food and non-food products can be packed in these bags by packaging equipment such as form, fill and seal machines and the filled bags sold to consumers.

For a variety of reasons, including difficulty in closing the zipper, some consumers prefer an easier way to open and close the zippers on these bags. As a result, zipper bags with a slider to open and close the zipper have become popular with these consumers. Product manufacturers, however, have not used the slider and zipper in their packaging equipment because there has not been a way to assemble and accumulate the sliders in a configuration that can be fed easily and quickly to the packaging equipment. In order to supply this market with sliders and zippers, it is desirable to assemble and accumulate sliders in a configuration that can be used with packaging equipment.

SUMMARY OF THE INVENTION

The present invention is directed to the assembly and accumulation of sliders for zippers having profiled tracks such as those used on plastic food storage bags. Once the sliders have been assembled and accumulated, they can be delivered to form, fill and seal machines or other packaging equipment for mounting onto zippers which are secured to plastic bags.

To be assembled for use in form, fill and seal machines or other packaging equipment, the sliders can be adhesively or mechanically joined together to form chains of sliders. This may be accomplished by adhesively joining the sliders together by the application of a strip of adhesive tape to a part of each slider. Instead of tape, a bead of hot melt adhesive may be used. In other embodiments, individual sliders may be joined together by heat or ultrasonic welding or melting a portion of each slider to a plastic state and pressing the sliders together to form a chain of sliders.

In the alternative, the sliders may be mechanically joined by snapping together male and female connectors that have been formed on each slider. In another embodiment, a chain of sliders may be formed by slideably mounting the sliders on a strip or web.

In order to supply sliders to a form, fill and seal machine, or other packaging equipment, it is preferred that assembled sliders be accumulated in sufficient quantities to allow extended operation of the machines or equipment. Individual sliders or chains of sliders can be accumulated for this purpose. One method of slider accumulation is to load oriented chains of sliders into a magazine or cartridge. The magazine or cartridge is then coupled at a slider supply location to a form, fill and seal machine. Another embodiment involves rolling a chain of sliders onto a spool or into a coreless roll. One end of the chain can be fed to the slider supply location of a form, fill and seal machine or other packaging equipment. A chain of sliders may also be Z-folded into a box or similar container with one end of the chain fed to a form, fill and seal machine or other packaging equipment.

BRIEF DESCRIPTION OF THE DRAWINGS

Other objects and advantages of the invention will become apparent upon reading the following detailed description and upon reference to the drawings in which.

DETAILED DESCRIPTION OF ILLUSTRATIVE EMBODIMENTS

Plastic food and storage bags having zippers that are closed and opened by a slider are increasingly popular with consumers. Food producers, packers and manufacturers of products that can be packaged in these bags by using form, fill and seal machines have yet to use the slider bags because assembled and accumulated sliders that can be fed efficiently and economically to a form, fill and seal machine have not been available.

Figure 1:
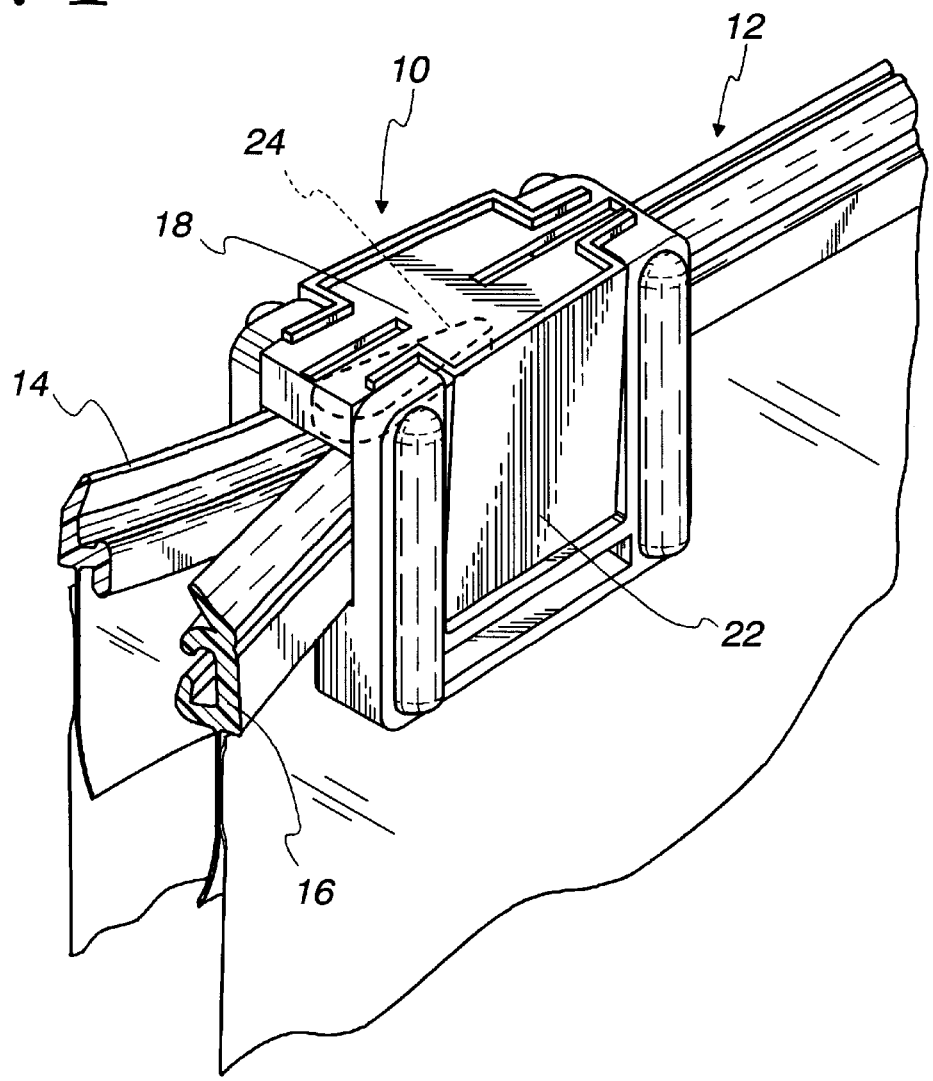
FIG. 1 is a perspective view of a slider mounted on a profiled zipper.

An example of a slider used with the zippers for plastic food and storage bags is illustrated in FIG. 1 and described in U.S. Pat. No. 5,063,644. This patent is assigned to the same assignee as the present application and this patent is incorporated herein by reference.

Referring to FIG. 1, a slider 10 of the type to be assembled and accumulated in accordance with the present invention is illustrated. The slider 10 straddles a zipper 12 which includes recloseable fastener elements or profiled male 14 and female 16 tracks. The slider 10 opens and closes the male 14 and female 16 tracks much in the same way as described in the aforementioned U.S. Pat. No. 5,063,644. The slider 10 has a transverse support member 18 which is U-shaped with two depending legs 22 and a separator finger 24 depending from the transverse support member 18 and between the depending legs 20 and 22.

Figure 2:
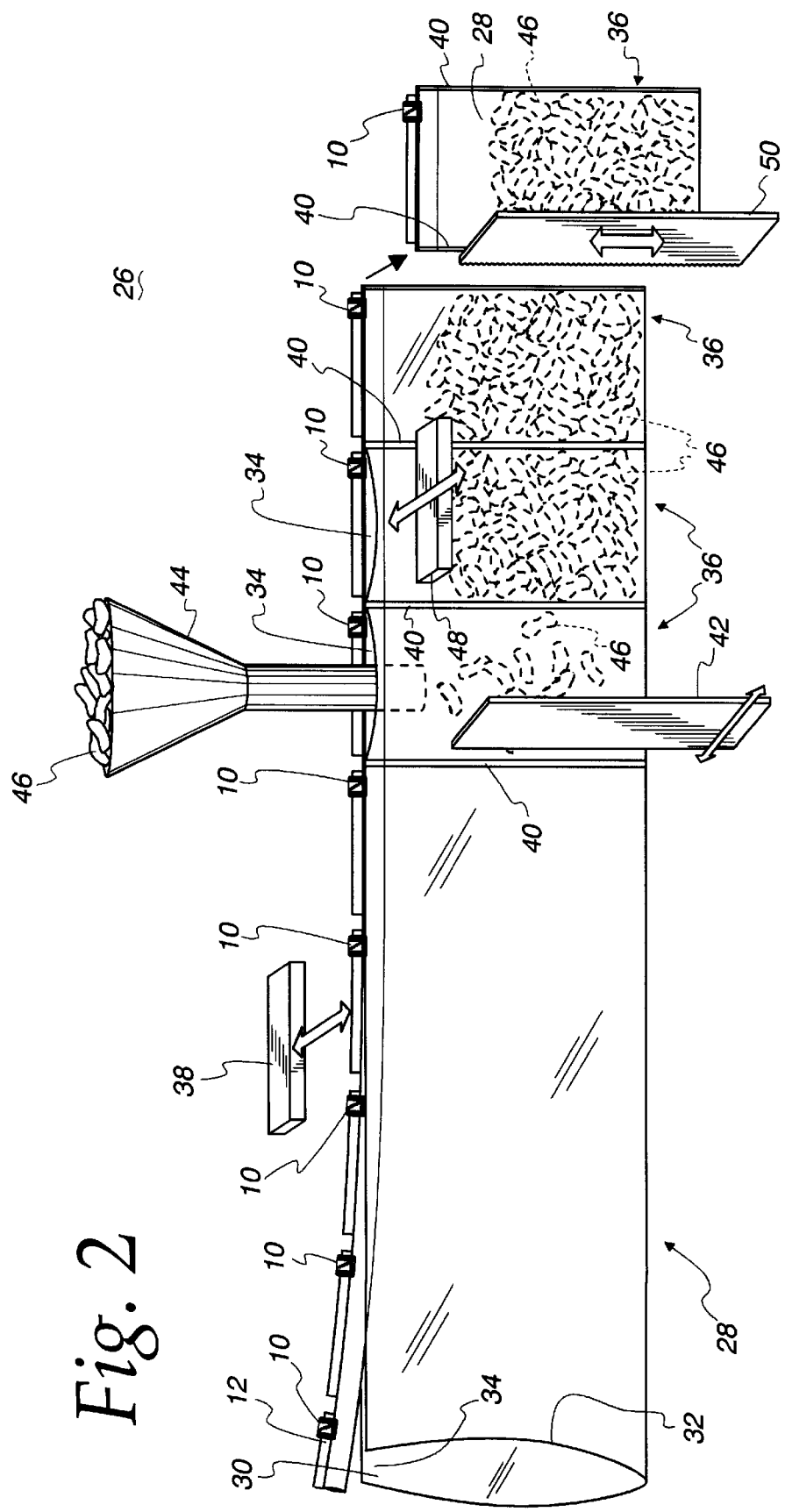
FIG. 2 is a diagram of the basic components of a form, fill and seal machine.

In order to form a food or storage bag with a slider 10 and zipper 12, fill the bag with product and seal the bag, a form, fill and seal machine is used or other packaging equipment may also be used but for purposes of explanation a form, fill and seal machine will be described here. Bag film or web, zippers 12 and sliders 10 must all be supplied to the machine and these components are assembled into a complete bag by the machine. A schematic illustration of a form, fill and seal machine 26 is provided in FIG. 2. As depicted at the left side of FIG. 2, a plastic film or web 28, a zipper 12 and sliders 10 mounted on the zipper 12 are fed to the form, fill and seal machine 26. The plastic film or web 28 has already been formed into a U-shape to define first 30 and second 32 sides and an open top 34 of what will become finished individual bags 36. In FIG. 2 the sliders 10 are shown as mounted on zipper 12; however, in accordance with the present invention, the sliders 10 are first assembled and accumulated and then mounted on the zipper 12 by the form, fill and seal machine 26.

The zipper 12 with the sliders 10 as shown in FIG. 2 is attached to the first side 30 of the web 28 by a heated seal bar 38. Side seals 40 are then formed in the web 28 by a second heated seal bar 42 leaving the open top 34 as the only access to the interior of the formed bag 36. The bag 36 is then moved under a fill spout 44 through which product such as nuts, candy, snacks, ingredients, salt, cheese or other food or non-food products 46 is deposited into the interior of each bag 36. After the bag 36 is filled, the second side 32 of the bag 36 is sealed to the zipper 12 by a third heated seal bar 48. The individual bags 36 are then separated from each other by a knife 50 that cuts the web 28 at the side seals 40. The filled bags 36 then can be shipped to retailers for sale to consumers.

Figure 3:
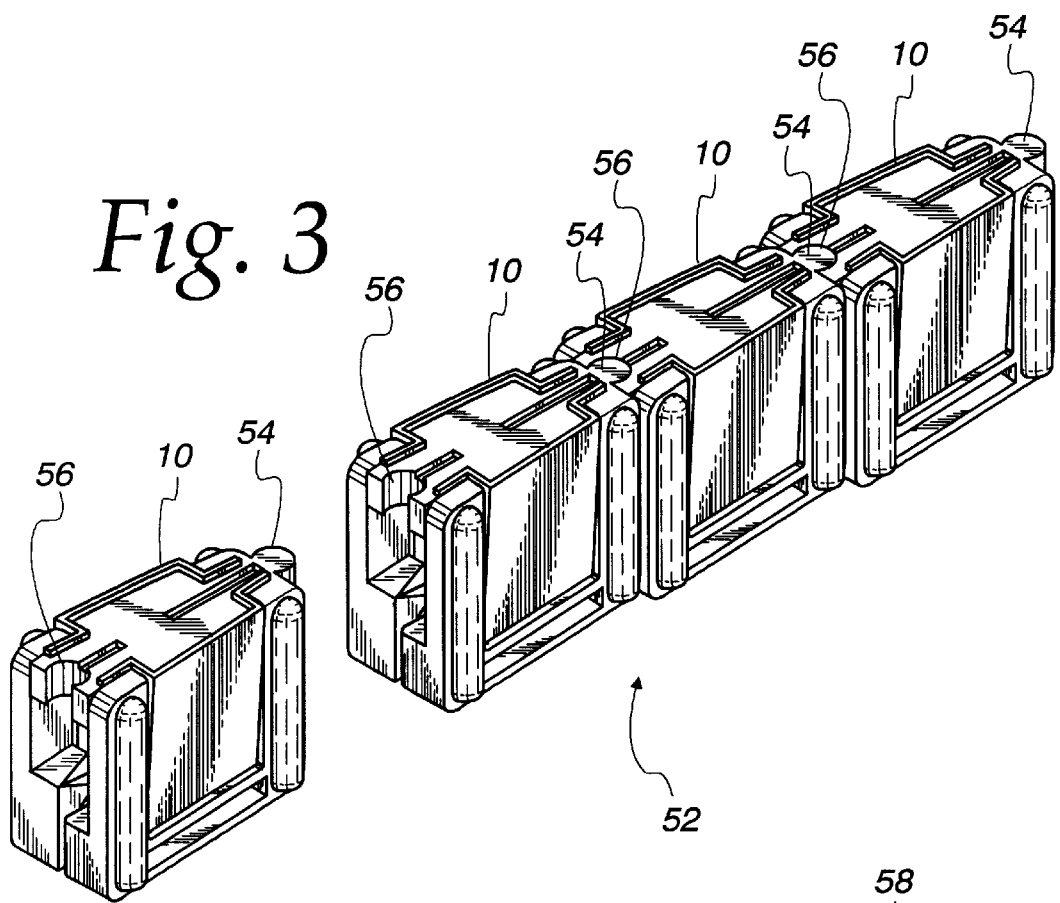
FIG. 3 is a perspective view of several sliders mechanically assembled by male and female snap connectors to form a chain of sliders.

Owners of form, fill and seal machines 26 and other packaging equipment prefer that these machines be fast and reliable. These goals can be achieved if the sliders 10 are assembled and accumulated prior to being fed into the form, fill and seal machine 26. The sliders 10 can be assembled into a chain 52 (FIG. 3) or a plurality of chains either mechanically or adhesively. The chains of sliders are fed to the form, fill and seal machine 26 where individual sliders 10 are separated and mounted on a zipper 12. To avoid waste, it is preferable that the sliders 10 are in direct contact with each other and without intervening pieces of material that remain as scrap after the sliders 10 are separated from the chain. One embodiment of mechanical assembly is illustrated in FIG. 3. In this embodiment, a male connector 54 and a female connector 56 are formed on different sides or ends of each slider 10. To mechanically assemble a chain 52 of sliders 10, a male connector 54 of one slider 10 is snapped into a female connector 56 of another slider 10. The placement of the male 54 and female 56 connectors on the sliders 10 determines the orientation of the sliders 10 in the chain 52. The chain 52 is fed to the form, fill and seal machine 26 which separates each slider 10 one-by-one from the chain 52 and mounts each slider 10 onto a zipper 12.

Figure 4:
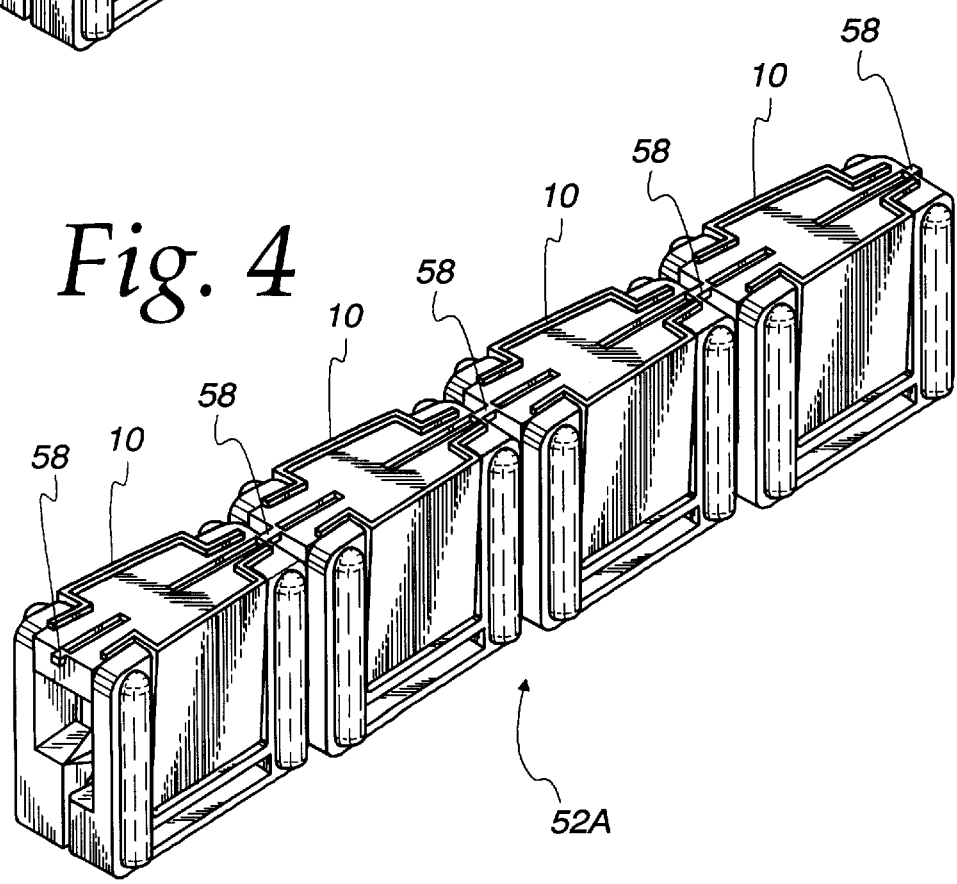
FIG. 4 is a perspective view of several sliders mechanically assembled by molding to form a chain of sliders.

In some situations it may be less expensive or preferable to assemble the sliders 10 together in a chain at the same time the sliders are molded. This embodiment is illustrated in FIG. 4. The sliders 10 in FIG. 4 are molded with a thin web or finger 58 between adjacent sliders 10 joining them in a chain 52A. The web 58 is strong enough to maintain its integrity during normal handling of the chain of sliders 52A, but a form, fill and seal machine need only apply a small force to break each web 58 to separate individual sliders 10 from the chain 52A and mount each slider 10 onto a zipper 12.

Figure 5:
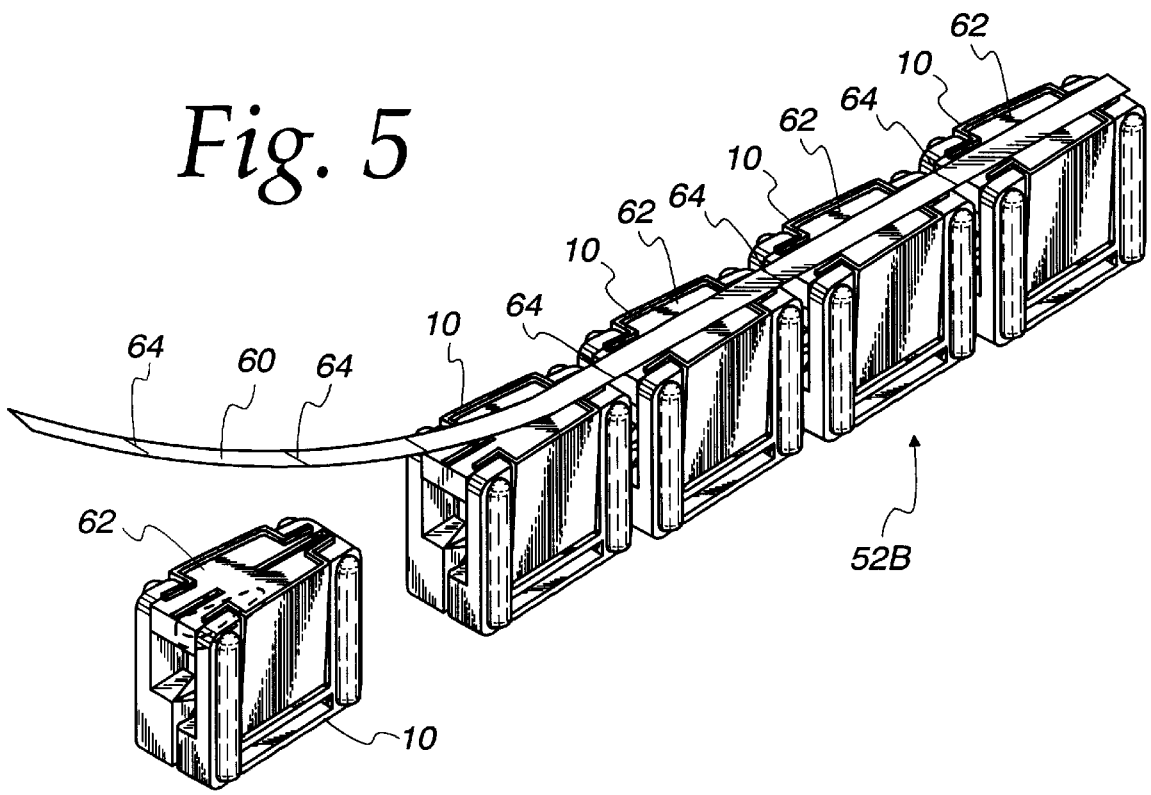
FIG. 5 is a perspective view of several sliders adhesively assembled by tape to form a chain of sliders.
Figure 16:
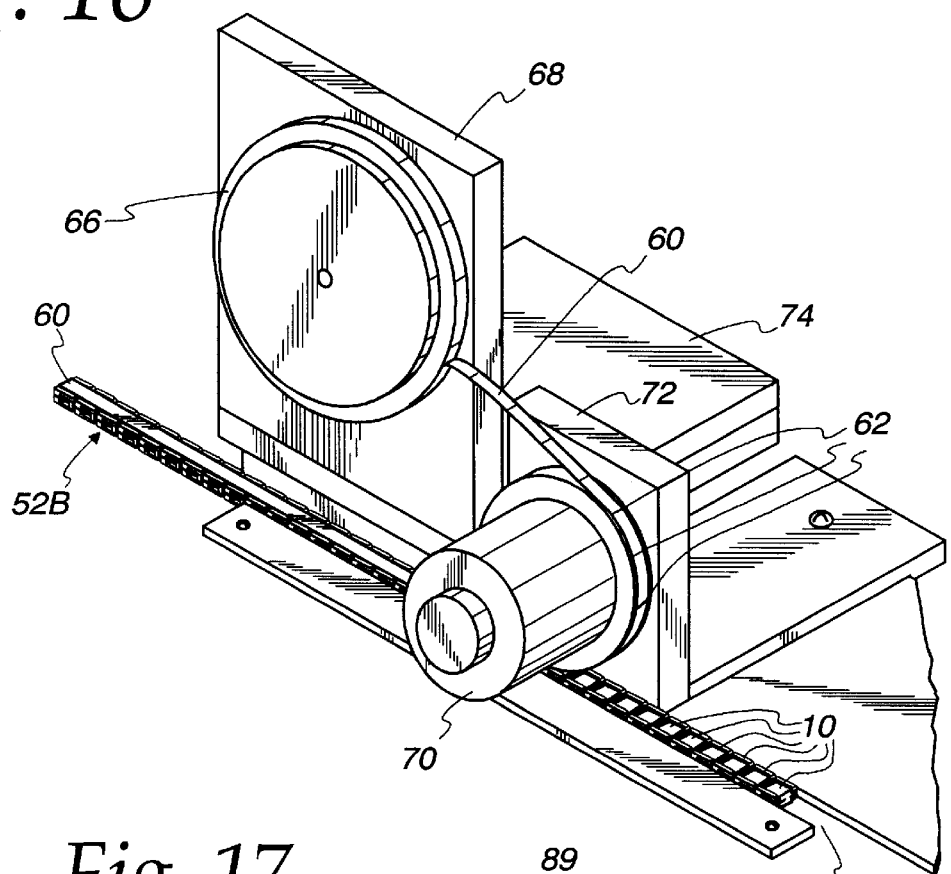
FIG. 16 is a perspective view of a mechanism for applying tape to individual sliders to adhesively assemble the sliders into a chain.

Another way to assemble sliders 10 adhesively is depicted in FIGS. 5 and 16. To assemble the sliders 10, the sliders 10 are oriented in the same direction and an adhesive tape 60 is applied along a portion of each slider 10 to form a chain of sliders 52B. In FIG. 5, the tape 60 is applied along the top 62 of the body portion of each slider 10. The tape 60 may be of sufficient strength to hold individual sliders 10 together during handling and to be torn by a form, fill and seal machine 26 as the sliders 10 are mounted on a zipper 12. Alternatively, lines of weakness 64 can be formed in the tape 60 at locations between adjacent sliders 10. The tape 60 can be severed at the lines of weakness 64 by the form, fill and seal machine 26.

An example of a system for applying the adhesive tape 60 to the individual sliders 10 to form a chain of sliders 52B is illustrated in FIG. 16. In this system a roll 66 of adhesive tape is mounted on a tape roll frame 68. A leading edge of the tape 60 is pulled from the roll 66 and wrapped around an application roller 70. The application roller is mounted on a roller frame 72, and the roller frame 72 and tape roll frame 68 are secured to a base 74. The base 74 includes a channel 76. Individual sliders 10 that have been oriented in a preferred manner are pushed into the channel 76. As each slider 10 is pushed under the roller 70, the adhesive tape 60 is applied to the portion of each slider 10 that engages the roller 70 and the tape 60 to form the chain of sliders 52B.

Figure 6:
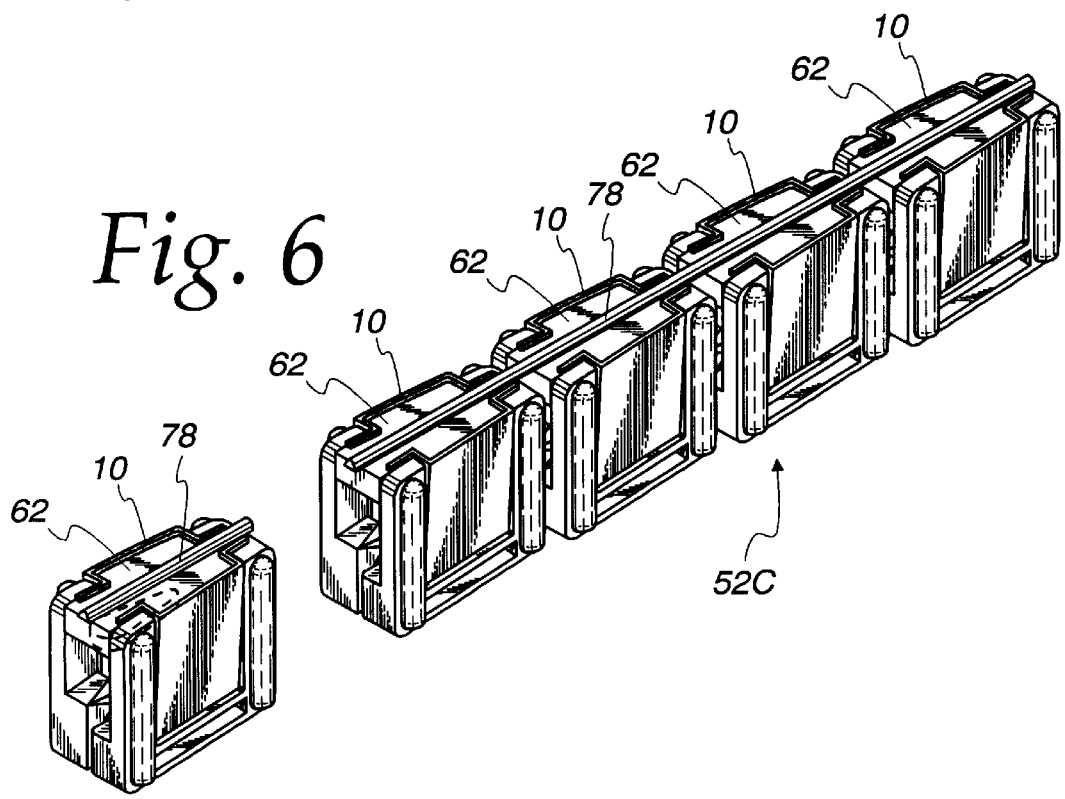
FIG. 6 is a perspective view of several sliders adhesively assembled by a bead of adhesive to form a chain of sliders.

Another way to assemble sliders 10 adhesively is by applying a bead or string of hot melt adhesive. As illustrated in FIG. 6, individual sliders 10 are oriented in a preferred orientation in a line and a continuous bead of hot melt adhesive 78 is applied on a portion of each slider 10 to form a chain of sliders 52C. In the embodiment illustrated, the bead 78 is applied to the top 62 of each slider 10. Once the bead 78 has cooled, it is of sufficient strength to hold the chain 52C together during normal handling, but it is easily broken at locations between adjacent sliders 10 by a form, fill and seal machine 26.

Figure 7:
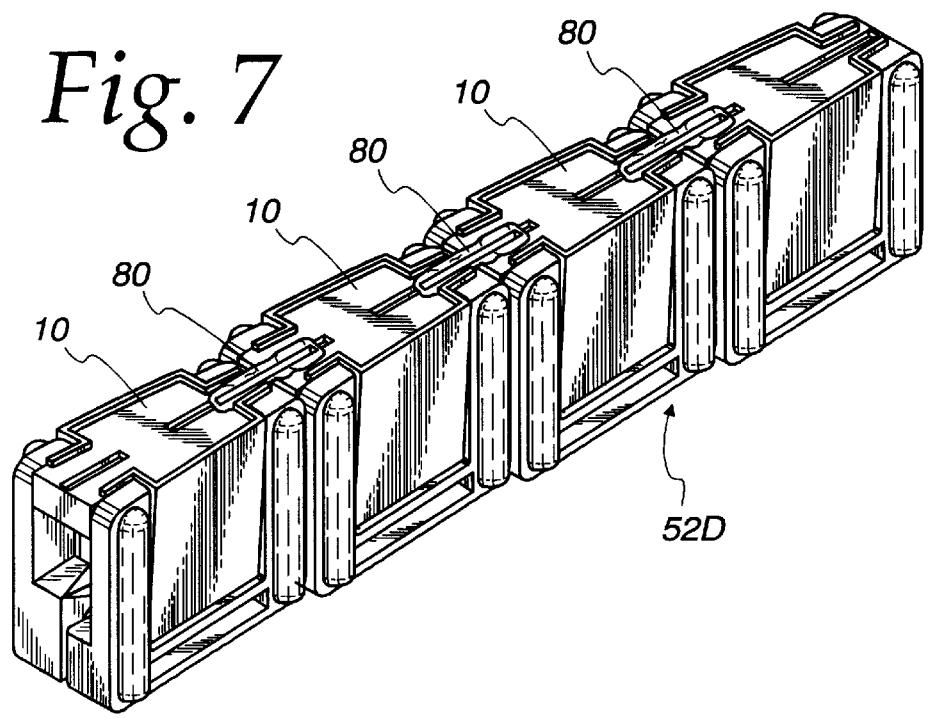
FIG. 7 is a perspective view of several sliders adhesively assembled by welding to form a chain of sliders.
Figure 17:
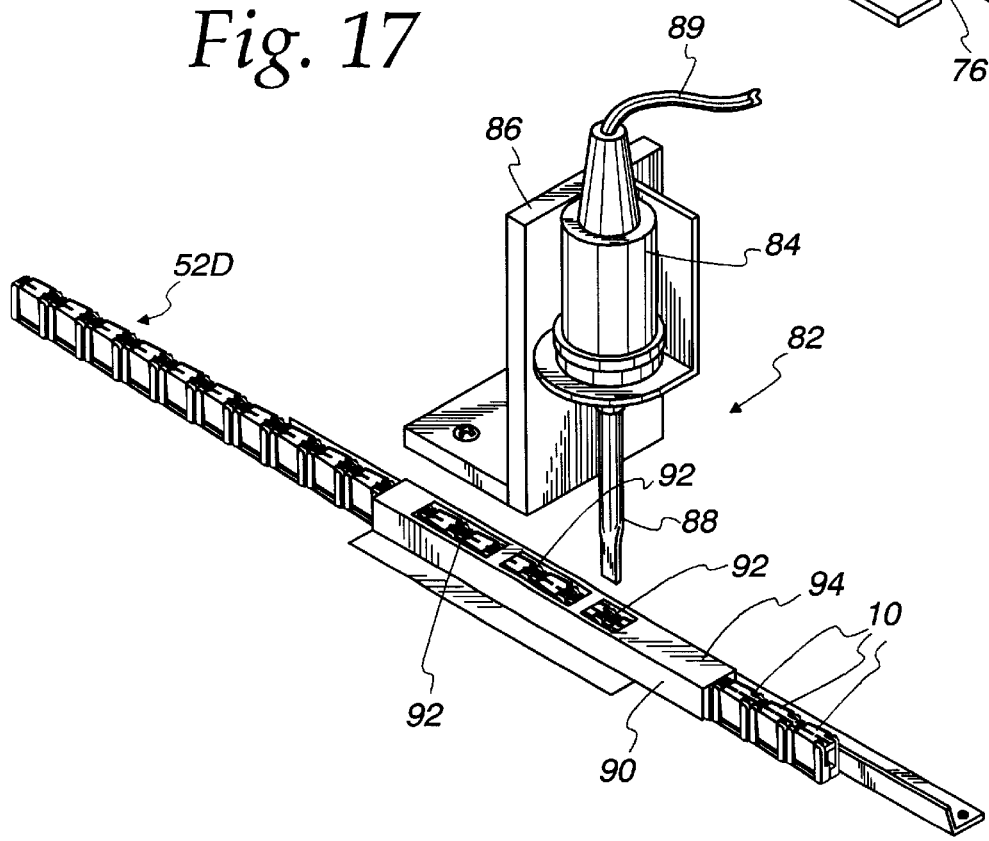
FIG. 17 is an illustration of a welding assembly for welding individual sliders to adhesively assemble the sliders into a chain.

Another way to assemble sliders 10 adhesively into a chain is by welding. This technique is depicted in FIGS. 7 and 17. Referring first to FIG. 7, there is depicted a chain of sliders 52D made up of individual sliders 10 assembled together by welds 80. The welds 80 are formed by a welding assembly 82 shown in FIG. 17. The welding assembly 82 includes an electric welder 84 mounted on a welding frame 86. The welder 84 includes a reciprocating welder blade 88 that is heated to welding temperature by power supplied by a cord 89. Directly below the welder blade 88, the welding assembly 82 includes a channel 90 exposed to the welder blade 88 through openings 92 formed in the top 94 of the channel 90. To weld individual sliders 10 to form the chain 52D, individual sliders 10 are oriented into the same orientation and pushed into the channel 90. When abutting sides of two adjacent sliders 10 are in the opening 92 below the welding blade 88, the welder 84 pushes the heated welder blade 88 into the abutting sliders 10 to form the weld 80 by heating a portion of each slider 10 to a plastic adhesive state thereby assembling the two sliders 10 and joining them to the chain 52D. The blade 88 is then withdrawn, the sliders 10 advanced in the channel 90, and the welding procedure is repeated.

Figure 8:
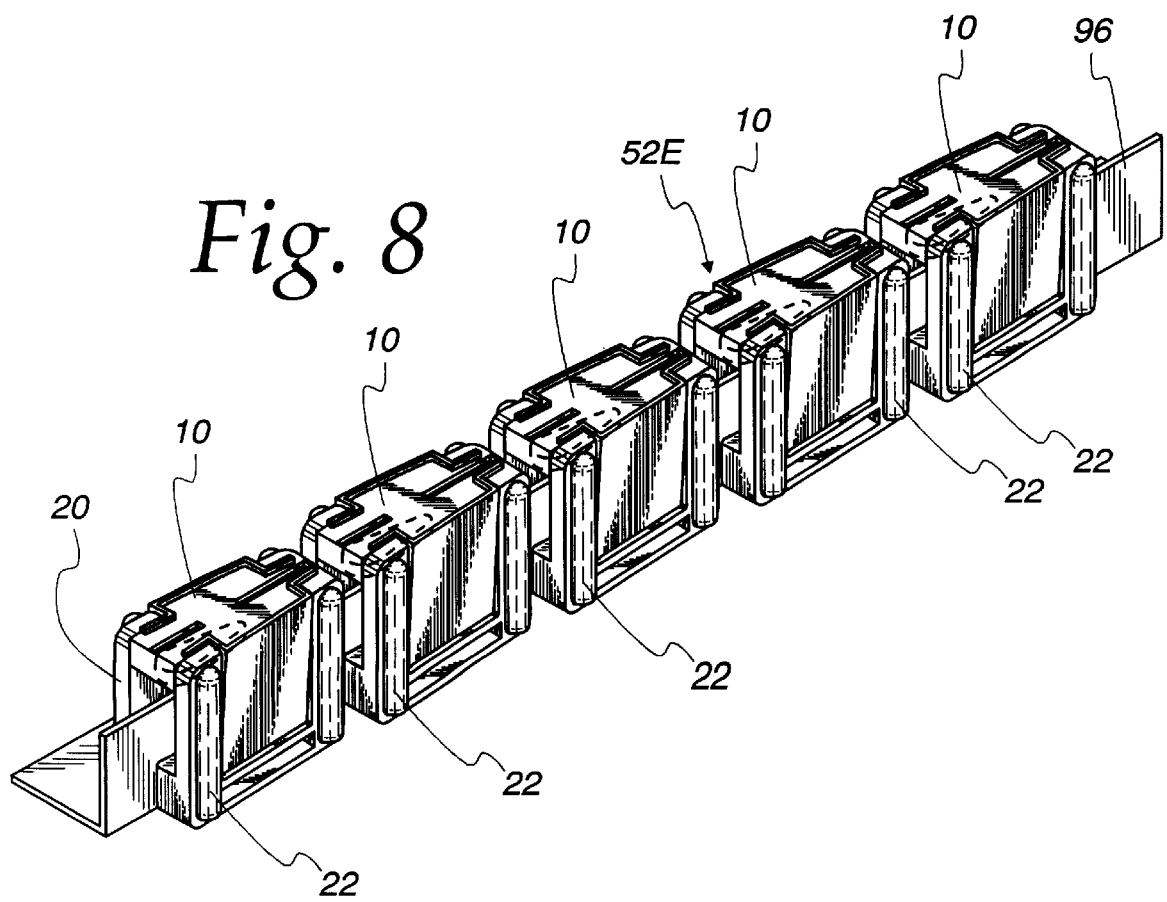
FIG. 8 is a perspective view of several sliders mechanically assembled by mounting the sliders on a strip to form a chain of sliders.

In another embodiment, the sliders 10 may be mechanically assembled on a strip 96 as shown in FIG. 8. The strip 96 is illustrated as being L-shaped but any shape which can be straddled by the depending legs 20 and 22 of the sliders 10 is contemplated. In this embodiment a chain 52E of sliders 10 is formed by orienting the sliders 10 in the preferred orientation and then placing each slider 10 on the strip 96 with the legs 20 and 22 on opposing sides of the strip 96. The strip 96 with the chain 52E of sliders 10 is introduced into a form, fill and seal machine 26 that slides individual sliders 10 off the strip 96 and mounts the sliders 10 onto a zipper 12.

Figure 9:
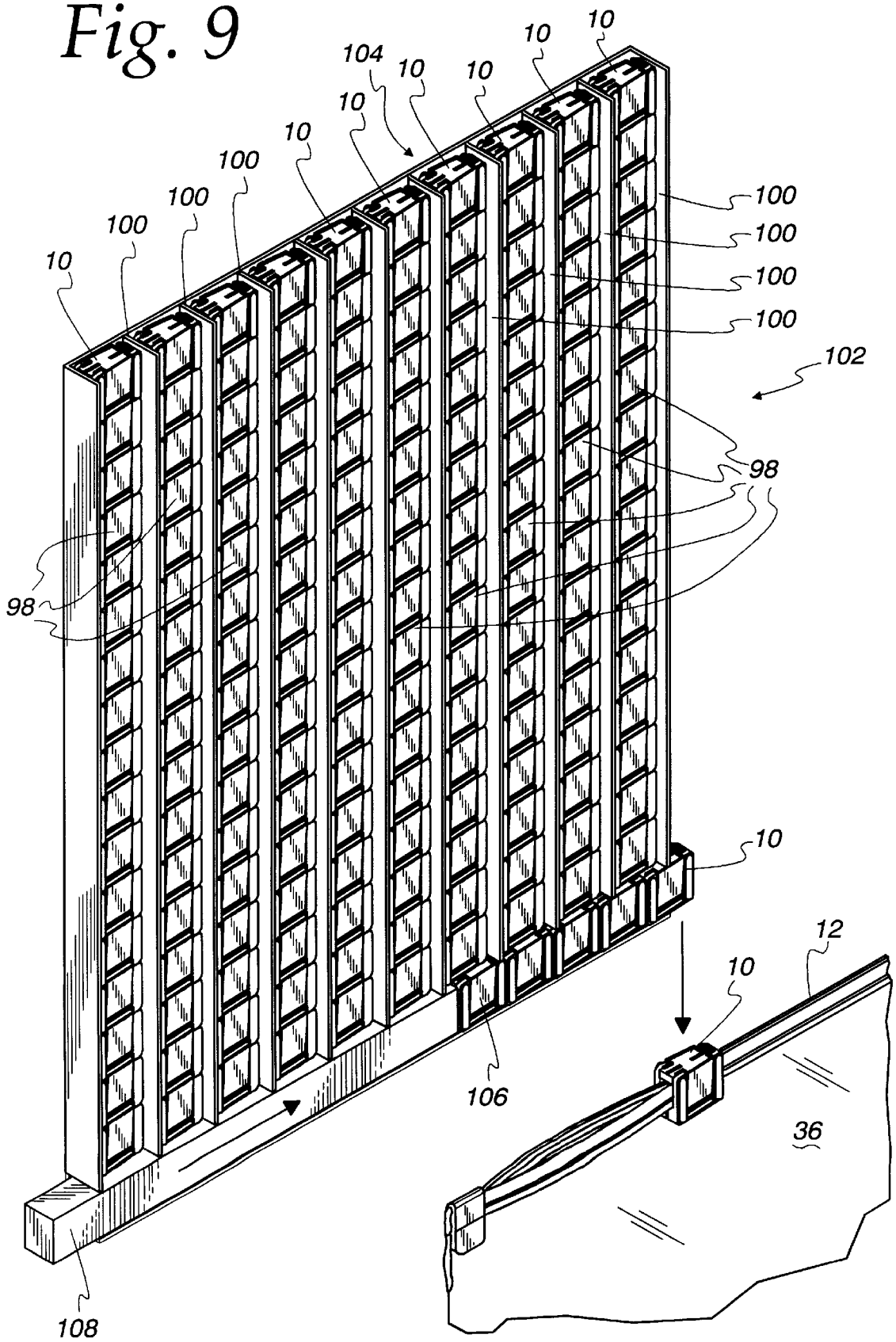
FIG. 9 is a perspective view of an accumulation of individual sliders in a cartridge and the feeding of individual sliders to a profiled zipper.

In order for a form, fill and seal machine 26 to mount the sliders 10 onto a zipper 12, individual sliders 10 or chains of sliders 52, 52A–E must be accumulated in a way that is compatible with the form, fill and seal machine 26. One way individual sliders 10 may be accumulated is illustrated in FIG. 9. In this embodiment individual sliders 10 are oriented in a preferred orientation and loaded into separate columns 98 defined by parallel walls 100 in a cartridge 102. The walls 100 are spaced apart a distance slightly larger than a slider 10 and oriented sliders are loaded into each column 98 at the open top 104 of the cartridge 102. An open-ended channel 106 is located at the bottom of the cartridge 102 and of the walls 100 and the bottom slider 10 in each column 98 is positioned in the channel 106. A reciprocating plunger 108 extends into the channel 106 to push individual sliders 10 out of an open end of the channel 106. This open end feeds a form, fill and seal machine 26 which mounts individual sliders 10 onto a zipper 12.

Figure 10:
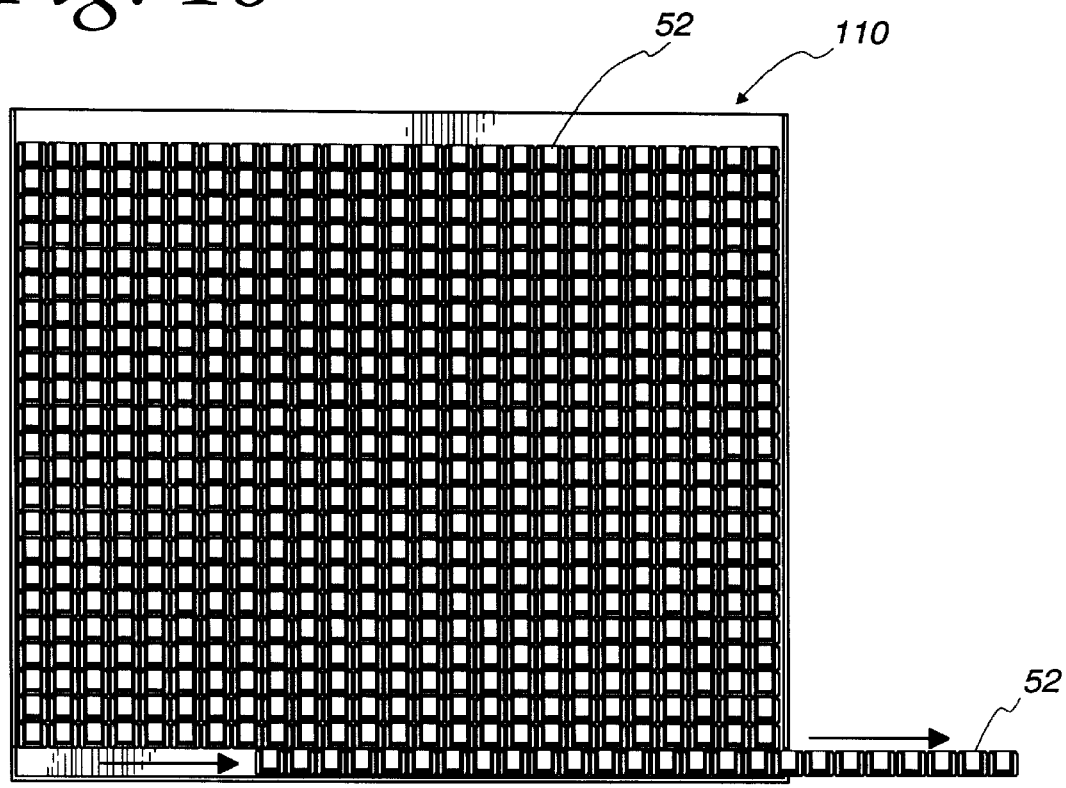
FIG. 10 is a plan view of an accumulation of chains of sliders in a cartridge.
Figure 11:
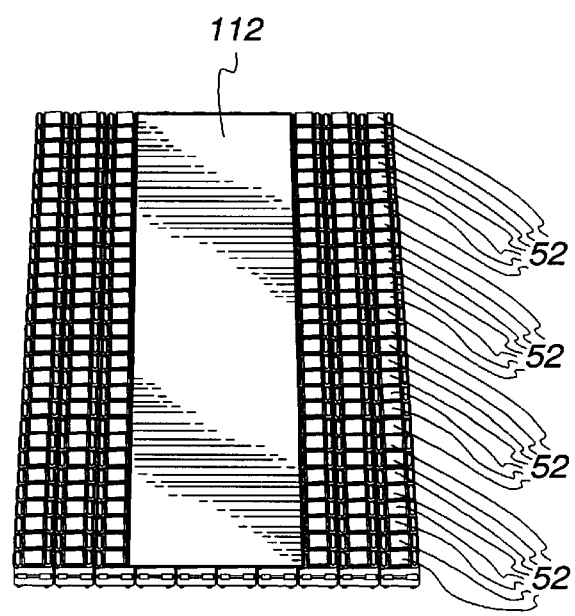
FIG. 11 is a perspective view of an accumulation of chains of sliders adhesively joined by tape.

A similar cartridge can be used to accumulate chains of sliders. As illustrated in FIG. 10 a cartridge 110 is similar to cartridge 102 except cartridge 110 does not have vertical walls such as the walls 100 in cartridge 102. This lack of vertical walls allows the stacking of chains 52 of sliders 10 in the cartridge 110. Instead of feeding individual sliders 10 to a form, fill and seal machine 26 as does cartridge 102, the cartridge 110 feeds chains 52 to the form, fill and seal machine 26 whereat individual sliders 10 are separated from the chain 52 and mounted on a zipper 12.

Figure 12:
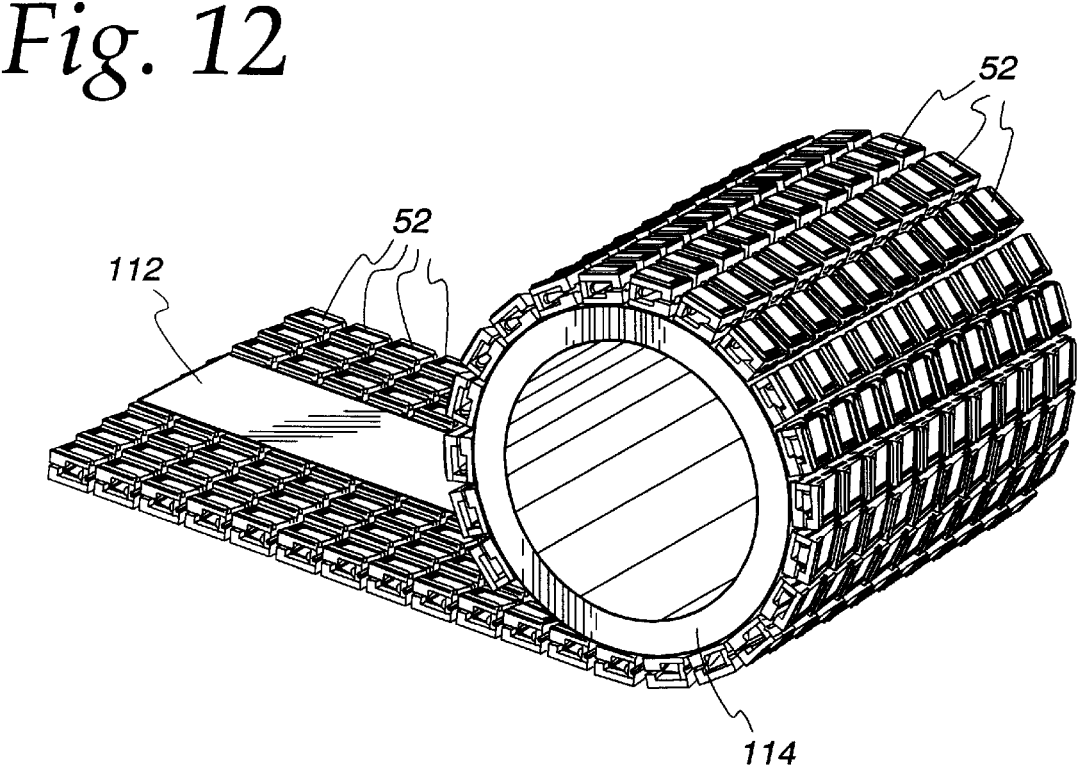
FIG. 12 is a perspective view of the accumulation of chains of sliders joined as illustrated in FIG. 11 and rolled onto a core.

Additional ways of accumulating chains of sliders are illustrated in FIGS. 11–15. Considering first the embodiment shown in FIGS. 11–12, individual chains of sliders 52 are arranged side-by-side with their lengths extending from left to right as viewed in FIG. 11. The chains 52 are secured together by an adhesive tape 112 secured to each chain 52 transverse to its length. This accumulation of chains 52 may be fed to a form, fill and seal machine 26 or rolled onto a core or spool 114 as shown in FIG. 12 which can be fed to a form fill and seal machine 26.

Figure 13:
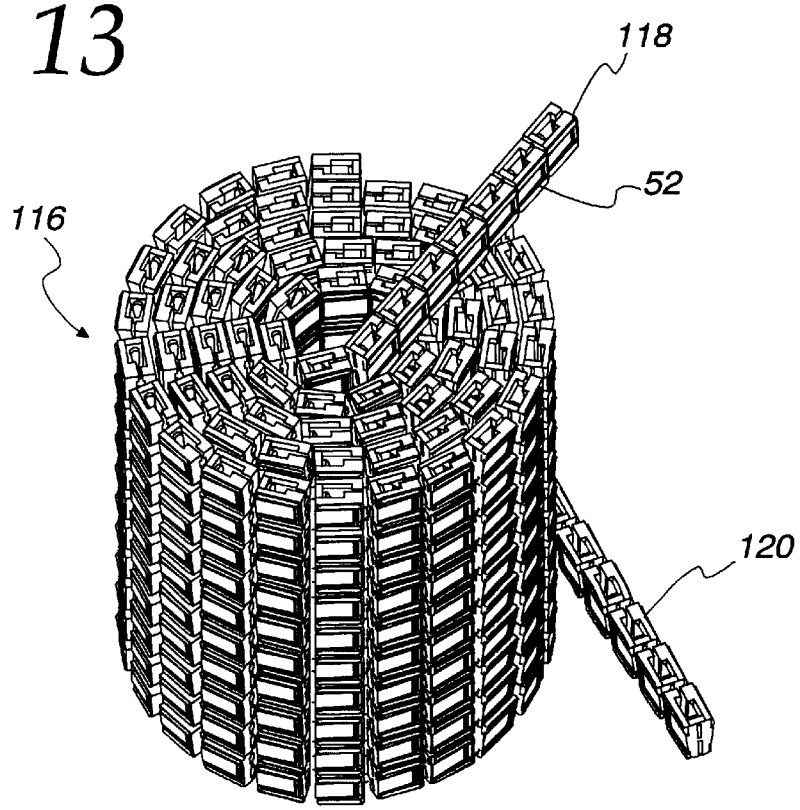
FIG. 13 is a perspective view of an accumulation of sliders rolled into a coreless roll.

A chain of sliders 52 may also be accumulated for feeding to a form, fill and seal machine 26 by winding the chain 52 into a coreless roll 116 as illustrated in FIG. 13. One end 118 of the chain 52 that originates from the center of the roll 116 may be fed to a form, fill and seal machine 26. A second end 120 of the chain 52 may be coupled to a first end 118 of a chain 52 of another coreless roll 116 providing an uninterrupted supply of sliders 10 to a form fill and seal machine 26.

Figure 14:
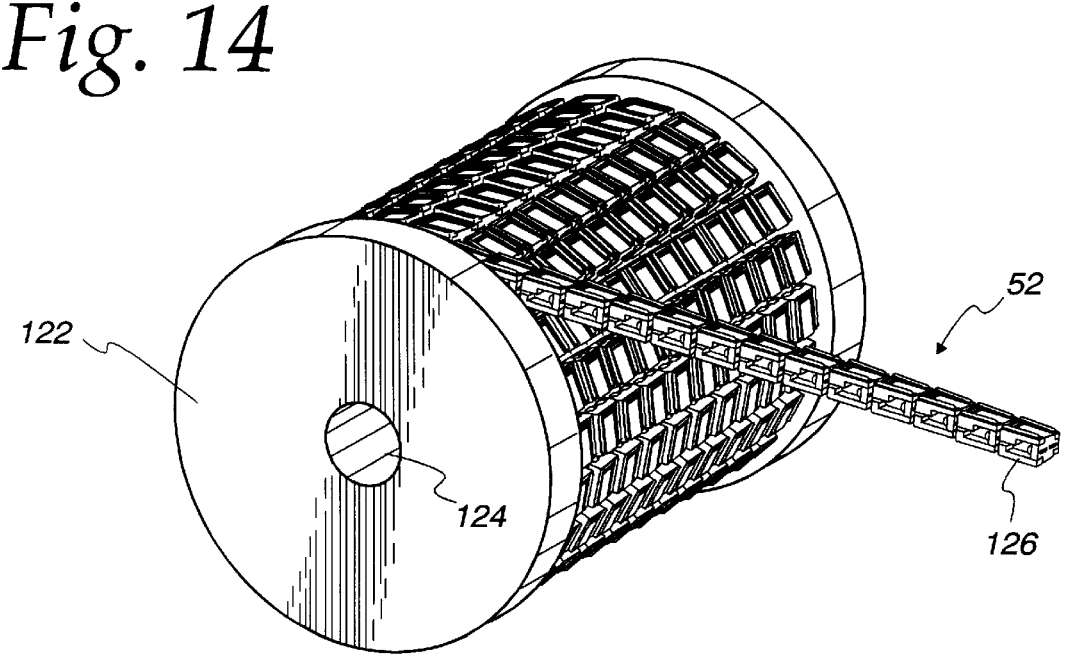
FIG. 14 is a perspective view of an accumulation of a chain of sliders rolled onto a spool.

A similar way to accumulate a chain of sliders 52 is illustrated in FIG. 14. In this embodiment a chain of sliders 52 is wound onto a spool or core 122. The spool 122 may be mounted on a rod or similar holder through an axial hole 124, and an end 126 of chain 52 can be unwound and fed to a form, fill and seal machine 26.

Figure 15:
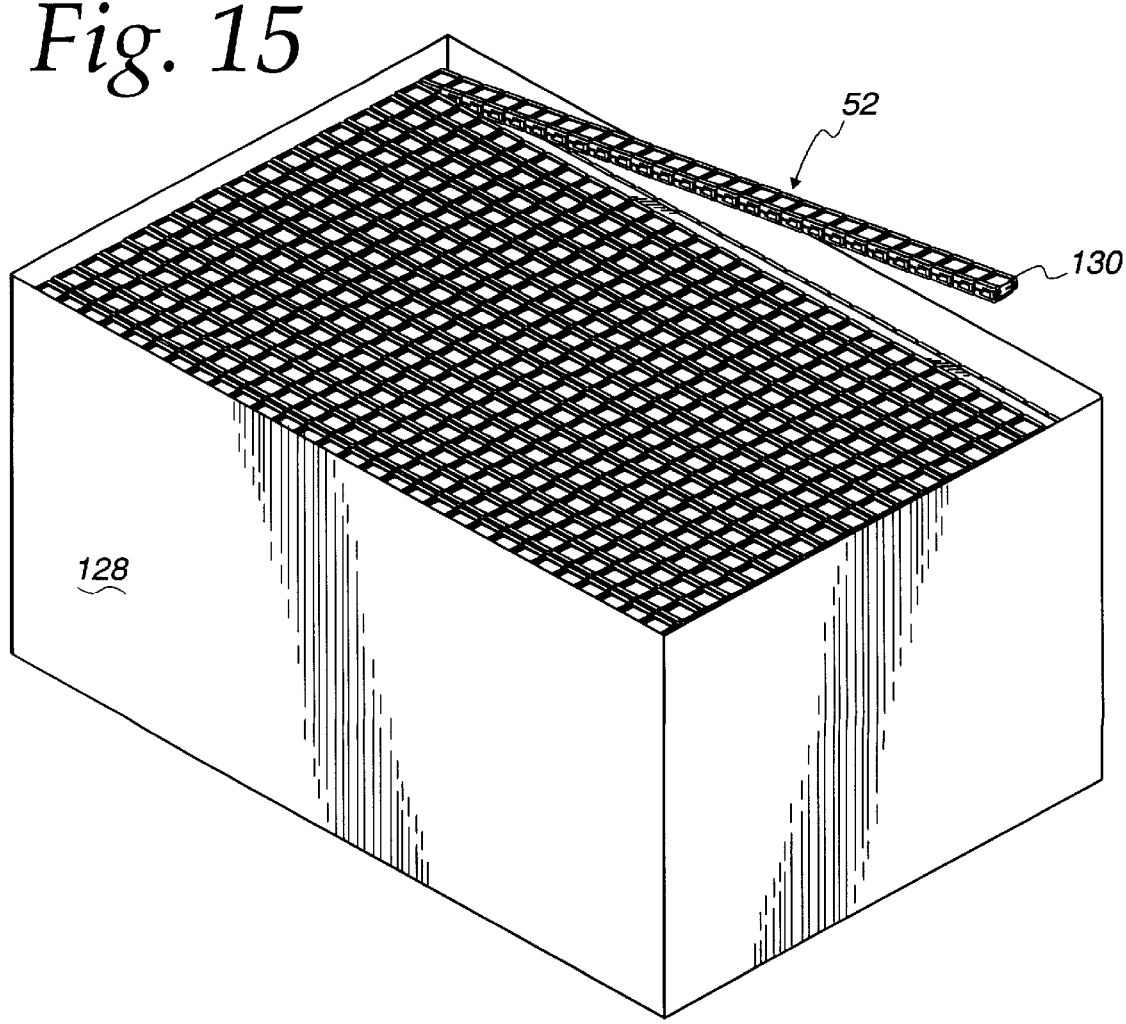
FIG. 15 is a perspective view of an accumulation of sliders in a chain with the chain Z-folded in a carton.

A chain of sliders 52 may also be accumulated by Z-folding the chain 52 into a carton 128 or similar package (FIG. 15). The carton 128 is easily shipped and stored, and when needed, an end 130 of the chain 52 can be fed to a form, fill and seal machine 26.

While the present invention has been described with reference to the particular embodiments illustrated, those skilled in the art will recognize that many changes and variations may be made thereto without departing from the spirit and scope of the present invention. The embodiments and obvious variations thereof are contemplated as falling within the scope and spirit of the claimed invention, which is set forth in the following claims:

What is claimed is:

1. A method of forming an assembly of sliders comprising:

arrranging a plurality of sliders in a predetermined orientation with each slider including a body portion, and adhesively joining said sliders to form a chain of sliders.

2. The method of forming an assembly of sliders claimed in claim 1 wherein said step of adhesively joining said sliders comprises applying a continuous strip of adhesive material on each said slider.

3. The method of forming an assembly of sliders claimed in claim 1 wherein the step of arranging a plurality of sliders includes aligning said sliders in a linear chain with each slider oriented in the same direction.

4. The method of forming an assembly of sliders claimed in claim 1 wherein said step of adhesively joining said sliders comprises adhesively joining said body portions of said respective sliders.

5. The method of forming an assembly of sliders claimed in claim 1 wherein said step of adhesively joining said sliders comprises applying a strip of adhesive tape to said body portions of said respective sliders.

6. The method of forming an assembly of sliders claimed in claim 1 wherein said step of adhesively joining said sliders comprises applying a continuous strip of hot melt adhesive to said body portions of said respective sliders.

7. The method of forming an assembly of sliders claimed in claim 1 wherein said step of adhesively joining said sliders comprises partially melting at least a portion of each said slider to a plastic adhesive state, and joining said sliders at said melted portions of said respective sliders.

8. A method of forming an assembly of sliders comprising the steps of arranging a plurality of sliders in a predetermined orientation wherein said sliders each includes a body portion, and mechanically joining said sliders in direct contact with each other to form a chain of sliders.

9. The method of forming an assembly of sliders claimed in claim 8 wherein said step of mechanically joining said sliders comprises forming a male connector on a first side of the body portion of each said slider, forming a female connector on a second side of the body portion of each said slider, and engaging the male connectors with respective adjacent ones of the female connectors to form a chain of said sliders.

10. The method of forming an assembly of sliders claimed in claim 8 wherein said step of mechanically joining said sliders comprises mounting said sliders on an elongated carrier strip.

11. The method of forming an assembly of sliders claimed in claim 8 further comprising the step of aligning each slider to have the same orientation.

12. An accumulation of sliders for recloseable zippers having complementary profiled tracks, comprising:
a plurality of sliders each having a body portion, and
a carrier for holding said plurality of sliders.

13. The accumulation of sliders claimed in claim 12 wherein said carrier includes access for placing said plurality of sliders in said carrier, said carrier including an outlet for removal of said sliders from said carrier.

14. The accumulation of sliders claimed in claim 12 further comprising an ejector for removing said sliders from said carrier.

15. The accumulation of sliders claimed in claim 12 wherein each slider of said plurality of sliders is of the same orientation in said carrier.

16. The accumulation of sliders claimed in claim 12 wherein said plurality of sliders are joined in a chain and said carrier is a coreless roll formed by said chain of sliders.

17. The accumulation of sliders claimed in claim 12 wherein said carrier is a cartridge.

18. The accumulation of sliders claimed in claim 12 wherein said carrier is a spool.

19. The accumulation of sliders claimed in claim 12 wherein said plurality of sliders are joined into a chain and said chain is Z-folded into said carrier.

20. The accumulation of sliders claimed in claim 12 wherein said carrier includes a carton.

21. The accumulation of sliders claimed in claim 12 wherein said carrier includes vertical columns for holding said sliders.

22. An accumulation of sliders for recloseable zippers having complementary profiled tracks, comprising:
a plurality of chains of sliders,
a carrier for said plurality of chains, said carrier including a securement member secured to said chains maintaining said chains adjacent to one another.

23. The accumulation of sliders claimed in claim 22 wherein said carrier further includes a core for winding said plurality of chains thereon.

24. The accumulation of sliders claimed in claim 22 wherein said carrier includes a tray for holding said chains and a transporter to transport said chains out of said tray.

25. The accumulation of sliders claimed in claim 22 wherein said securement member is tape adhered to and extending transversely to said chains.

26. A method of accumulating a plurality of sliders for recloseable zippers having complementary profiled tracks, comprising:
orienting said sliders in a predetermined orientation, and
loading a carrier with said sliders in said predetermined orientation.

27. The method of accumulating sliders claimed in claim 26 further comprising joining said sliders into at least one chain before loading said carrier.

28. The method of accumulating sliders claimed in claim 26 further comprising ejecting one slider at a time from said carrier.

29. The method of accumulating sliders claimed in claim 26 further comprising ejecting at least one chain of sliders at a time from said carrier.

30. The method of accumulating sliders claimed in claim 26 comprising forming a chain of said sliders, and Z-folding said chain into said carrier.

31. The method of accumulating sliders claimed in claim 26 comprising forming said sliders into a chain, and rolling said chain into a coreless roll.

32. A new method of forming an assembly of sliders to be supplied to a form, fill and seal machine for attachment of individual sliders from said assembly to a reclosable zipper on a bag, comprising:
orienting individual sliders of a plurality of sliders into a uniform orientation;
joining each slider to an adjacent slider to form a chain of sliders suitable for supplying to a form, fill and seal machine for attachment of said individual sliders to a reclosable zipper on a bag.

33. The method of forming an assembly of sliders claimed in claim 32 wherein said step of joining comprises applying a continuous strip of adhesive material to each slider.

34. The method of forming an assembly of sliders claimed in claim 32 wherein said step of joining comprises applying a strip of adhesive tape to adjacent sliders along said chain of individual sliders.

35. The method of forming an assembly of sliders claimed in claim 32 wherein said step of joining comprises applying a continuous strip of hot melt adhesive to adjacent sliders along said chain of individual sliders.

36. The method of forming an assembly of sliders claimed in claim 32 wherein said step of joining comprises mechanically joining said sliders in direct contact with each other.

37. The method of forming an assembly of sliders claimed in claim 32 wherein said step of joining comprises mounting each slider in said uniform orientation onto a carrier strip.

38. An accumulation of sliders to be supplied to a form, fill and seal machine for attachment of individual sliders from said accumulation of sliders to a reclosable zipper on a bag, comprising:
a plurality of individual sliders, and
a carrier for holding said plurality of sliders, said carrier adapted for coupling to a form, fill and seal machine to feed said sliders to said form, fill and seal machine.

39. The accumulation of sliders claimed in claim 38 wherein said carrier include an ejector for removing said sliders from said carrier and feeding said sliders to said form, fill and seal machine.

40. A method of forming an assembly of sliders comprising:
arranging a plurality of sliders in a predetermined orientation with each slider including a body portion, and
adhesively joining said sliders to form a chain of sliders, wherein said step of adhesively joining said sliders comprises partially melting at least a portion of each said slider to a plastic adhesive state, and joining said sliders at said melted portions of said respective sliders.

41. A method of forming an assembly of sliders comprising the steps of arranging a plurality of sliders in a prede termined orientation wherein said sliders each includes a body portion, and mechanically joining said sliders in direct contact with each other to form a chain of sliders, wherein said step of mechanically joining said sliders comprises forming a male connector on a first side of the body portion of each said slider, forming a female connector on a second side of the body portion of each said slider, and engaging the male connectors with respective adjacent ones of the female connectors to form a chain of said sliders.

* * * * *